(12) United States Patent
Aoki

(10) Patent No.: US 9,188,044 B2
(45) Date of Patent: *Nov. 17, 2015

(54) HONEYCOMB CATALYST BODY (71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/086,046

(22) Filed: Nov. 21, 2013

(65) Prior Publication Data
US 2014/0154145 A1    Jun. 5, 2014

(30) Foreign Application Priority Data

Dec. 3, 2012 (JP) .................... 2012-264748
Jun. 10, 2013 (JP) .................... 2013-121467

(51) Int. Cl.
B01D 50/00     (2006.01)
B01D 53/34     (2006.01)
B01J 21/04     (2006.01)
B01J 23/02     (2006.01)
(Continued)

(52) U.S. Cl.
CPC ............. F01N 3/2828 (2013.01); B01J 35/002 (2013.01); B01J 35/0006 (2013.01); B01J 35/04 (2013.01); B01J 35/10 (2013.01); B01J 35/1076 (2013.01); B01J 37/0215 (2013.01); C04B 38/0009 (2013.01); C04B 2111/0081 (2013.01); Y02T 10/22 (2013.01)

(58) Field of Classification Search
CPC .................................. B01J 35/04; B01J 35/10
USPC .......................................... 502/439; 422/180
See application file for complete search history.

(56) References Cited

U.S. PATENT DOCUMENTS 4,364,760 A * 12/1982 Higuchi et al. ................. 55/523
7,208,214 B2 *  4/2007 Ichikawa ...................... 428/116
(Continued)

FOREIGN PATENT DOCUMENTS

JP    2003-205245 A1    7/2003
JP    2003-307115 A1    10/2003
(Continued)

OTHER PUBLICATIONS

Extended European Search Report (Application No. 13194031.4) dated Apr. 9, 2014.

Primary Examiner — Cam N. Nguyen
(74) Attorney, Agent, or Firm — Burr & Brown, PLLC (57) ABSTRACT A honeycomb catalyst body includes a plugged honeycomb structure having porous partition walls, inflow side plugged portions, outflow side plugged portions, and porous projecting portions which project so as to extend from the partition walls into the cells and are formed integrally with the partition walls; and catalyst loaded onto the projecting portions of the plugged honeycomb structure. A porosity of the partition walls of the plugged honeycomb structure is 40 to 70%, a thickness of the projecting portions is from 30 to 140% of a thickness of the partition walls, and an amount of a catalyst loaded onto pore surfaces of the partition walls of the plugged honeycomb structure is smaller than an amount of the catalyst loaded onto the projecting portions. The catalyst loaded onto projecting portions is a three-way catalyst, and the catalyst loaded onto projecting portions is a selective reduction catalyst.

11 Claims, 2 Drawing Sheets (51) Int. Cl.
*F01N 3/28* (2006.01)
*B01J 35/00* (2006.01)
*B01J 35/04* (2006.01)
*B01J 35/10* (2006.01)
*B01J 37/02* (2006.01)
*C04B 38/00* (2006.01)
*C04B 111/00* (2006.01)

(56) References Cited

U.S. PATENT DOCUMENTS

| | | | |
|---|---|---|---|
| 7,438,868 B2 * | 10/2008 | Kato | 422/180 |
| 7,504,359 B2 * | 3/2009 | Ogyu et al. | 502/439 |
| 7,601,195 B2 * | 10/2009 | Ichikawa | 55/523 |
| 7,611,560 B2 * | 11/2009 | Ichikawa | 55/523 |
| 7,754,160 B2 * | 7/2010 | Miyairi et al. | 422/180 |
| 7,927,551 B2 * | 4/2011 | Miyairi et al. | 422/168 |
| 7,951,338 B2 * | 5/2011 | Miyairi et al. | 422/177 |
| 8,283,282 B2 * | 10/2012 | Noguchi et al. | 502/439 |
| 8,409,519 B2 * | 4/2013 | Watanabe et al. | 422/180 |
| 8,470,254 B2 * | 6/2013 | Mizutani et al. | 422/177 |
| 8,470,255 B2 * | 6/2013 | Mizutani et al. | 422/177 |
| 8,580,009 B2 * | 11/2013 | Hiramatsu et al. | 55/523 |
| 8,603,942 B2 * | 12/2013 | Goto et al. | 502/439 |
| 8,609,581 B2 * | 12/2013 | Miyairi | 502/423 |
| 8,663,356 B2 * | 3/2014 | Goto et al. | 55/523 |
| 8,734,558 B2 * | 5/2014 | Miyairi | 55/523 |
| 8,747,508 B2 * | 6/2014 | Isoda et al. | 55/523 |
| 8,747,509 B2 * | 6/2014 | Kikuchi | 55/523 |
| 8,764,872 B2 * | 7/2014 | Isoda et al. | 55/523 |
| 8,814,975 B2 * | 8/2014 | Kikuchi | 55/523 |
| 2004/0131512 A1 * | 7/2004 | Abe et al. | 422/180 |
| 2007/0184240 A1 * | 8/2007 | Ichikawa | 428/116 |
| 2009/0047188 A1 * | 2/2009 | Miyairi et al. | 422/180 |
| 2011/0201493 A1 | 8/2011 | Goto et al. | |
| 2014/0086805 A1 * | 3/2014 | Sugimoto et al. | 422/180 |

FOREIGN PATENT DOCUMENTS

| | | |
|---|---|---|
| JP | 2005-220848 A1 | 8/2005 |
| JP | 2011-149360 A1 | 8/2011 |

* cited by examiner

HONEYCOMB CATALYST BODY

The present application is an application based on JP-2013-121467 filed on Jun. 10, 2013 and JP-2012-264748 filed on Dec. 3, 2012 with the Japanese Patent Office, the entire contents of which are incorporated herein by reference.

BACKGROUND OF THE INVENTION

1. Field of the Invention

The present invention relates to a honeycomb catalyst body. More particularly, it relates to a honeycomb catalyst body which can be contained even in a limited space and which has high mechanical strength, small pressure loss, and suitable purification performance.

2. Description of Related Art

It has been demanded that harmful substances such as $NO_x$ in exhaust gases discharged from internal combustion engines such as a car engine, a construction machine engine and an industrial machine stationary engine, the other burning devices and the like are purified and then discharged, in consideration of influences on the environment. Therefore, to purify the harmful substances, there has been used an exhaust gas purifying device including a plurality of honeycomb catalyst bodies each having a constitution in which a catalyst is loaded onto a honeycomb structure as a loading body.

As each honeycomb catalyst body, for example, there is known a honeycomb catalyst body including partition walls which define and form a plurality of cells to become through channels of a fluid and onto which a predetermined catalyst is loaded. Moreover, when the honeycomb catalyst body is used, the catalyst comes in contact with an exhaust gas in a case where the exhaust gas flows through the cells of the honeycomb catalyst body, so that the harmful substances in the exhaust gas can be purified.

Examples of the honeycomb catalyst body include a honeycomb catalyst body loaded with a selective reduction catalyst (SCR), a honeycomb catalyst body loaded with an ammonia slip preventing catalyst (ASC), and a honeycomb catalyst body loaded with a three-way catalyst and the like. In the above exhaust gas purifying device, these honeycomb catalyst bodies are suitably selected and arranged in series. Specifically, an exhaust gas purifying device is known in which a first catalyst body loaded with a lean $NO_x$ adsorber catalyst or the three-way catalyst is disposed on an upstream side, and a second catalyst body loaded with the selective reduction catalyst is disposed on a downstream side of the first catalyst body (e.g., see Patent Document 1). In this exhaust gas purifying device, when an air-fuel ratio of an engine is rich and specifically about 14.0, ammonia is generated from $NO_x$ and $H_2$ in the exhaust gas by use of the first catalyst body. Afterward, $NO_x$ in the exhaust gas can be reduced and detoxified in the second catalyst body by use of the generated ammonia.

[Patent Document 1] JP-A-2011-149360

SUMMARY OF THE INVENTION

An exhaust gas purifying device disclosed in Patent Document 1 includes a plurality of catalyst bodies to reduce and detoxify $NO_x$ in an exhaust gas. On the other hand, a space where this exhaust gas purifying device is disposed is limited, and it has earnestly been desired that especially an exhaust gas purifying device to be mounted in a car or the like (especially a honeycomb catalyst body) is miniaturized.

On the other hand, a wall flow type honeycomb catalyst body in which a catalyst is loaded onto pore surfaces of porous partition walls of a wall flow type honeycomb structure is also known. However, in this honeycomb catalyst body, a porosity of each partition wall is set to a large porosity for the purpose of increasing an amount of the catalyst to be loaded or the purpose of preventing an increase of a pressure loss. In such a honeycomb catalyst body, the above purposes can be achieved, but a mechanical strength of the partition walls cannot sufficiently be obtained sometimes since the porosity of the partition wall is set to the large porosity. Therefore, when a load is applied to the partition walls at canning, the partition walls are broken sometimes.

The present invention has been developed in view of the problems of such conventional technologies. An object thereof is to provide a honeycomb catalyst body which can be contained even in a limited space and which has high mechanical strength, small pressure loss, and suitable purification performance.

According to the present invention, a honeycomb catalyst body is provided as follows.

[1] A honeycomb catalyst body including a plugged honeycomb structure having porous partition walls which define and form a plurality of cells extending from an inflow side end surface to an outflow side end surface to become through channels of a fluid, inflow side plugged portions provided at outflow side ends of the predetermined cells, outflow side plugged portions provided at outflow side ends of the remaining cells, and porous projecting portions which project so as to extend from the partition walls into inflow cells, that are defined as the cells provided with the outflow side plugged portions, and into outflow cells, that are defined as the cells provided with the inflow side plugged portions, and which are formed integrally with the partition walls; and a catalyst loaded onto the projecting portions of the plugged honeycomb structure, wherein a porosity of the partition walls of the plugged honeycomb structure is from 40 to 70%, a thickness of the projecting portions is from 30 to 140% of a thickness of the partition walls, an amount of a catalyst loaded onto the partition walls in a cross section vertical to an extending direction of the cells is 40% or less of a total amount of the catalyst loaded onto the plugged honeycomb structure, and the amount of the catalyst loaded onto the partition walls is smaller than an amount of the catalyst loaded onto the projecting portions, and the catalyst loaded onto the projecting portions extending into the inflow cells of the plugged honeycomb structure is a three-way catalyst or an $NO_x$ adsorber catalyst, and the catalyst loaded onto the projecting portions extending into the outflow cells of the plugged honeycomb structure is a selective reduction catalyst, or the catalyst loaded onto the projecting portions extending into the inflow cells of the plugged honeycomb structure is a three-way catalyst, and the catalyst loaded onto the projecting portions extending into the outflow cells of the plugged honeycomb structure is an $NO_x$ adsorber catalyst.

[2] The honeycomb catalyst body according to the above [1], wherein the amount of the catalyst loaded onto the partition walls of the plugged honeycomb structure is 5% or less of the total amount of the catalysts loaded onto the plugged honeycomb structure.

[3] The honeycomb catalyst body according to the above [1] or [2], wherein an average pore diameter of the partition walls of the plugged honeycomb structure is 25 µm or less.

[4] The honeycomb catalyst body according to any one of the above [1] to [3], wherein each of the projecting portions of the plugged honeycomb structure is in the form of a wall which partitions the cell to form a plurality of cells.

[5] The honeycomb catalyst body according to any one of the above [1] to [3], wherein each of the projecting portions of the plugged honeycomb structure is in the form of a protrusion which projects from the partition wall.

[6] The honeycomb catalyst body according to any one of the above [1] to [5], wherein the thickness of the partition walls of the plugged honeycomb structure is from 64 to 508 µm.

When $NO_x$ are purified by a conventional selective reduction catalyst, it has heretofore been necessary to generate ammonia by throwing urea from the outside. For this purpose, an injector to jet urea or a tank to store urea is required, and it has been necessary to add a large-scale system (an urea jet system). On the other hand, in a method of generating ammonia by use of a three-way catalyst or an $NO_x$ adsorber catalyst, ammonia can be generated by control of an air-fuel ratio of a fuel. Consequently, there is the advantage that the above additional system concerning the jetting of urea (the urea jet system) is not required. In the honeycomb catalyst body of the present invention, the three-way catalyst or the $NO_x$ adsorber catalyst is loaded onto projecting portions extending into inflow cells of a plugged honeycomb structure, and the selective reduction catalyst is loaded onto projecting portions extending into outflow cells of the plugged honeycomb structure. By employing such a constitution, the above-mentioned urea jet system is not required. Furthermore, in the conventional urea jet system, a plurality of honeycomb catalyst bodies have been used, but harmful substances in an exhaust gas can suitably be purified by one honeycomb catalyst body.

Moreover, another system that purifies $NO_x$ is a system using the $NO_x$ adsorber catalyst. In this system, as compared with a system using the selective reduction catalyst, an additional device such as the urea jet system is not required, but an $NO_x$ adsorption ability cannot sufficiently be obtained at low temperatures. Therefore, it is demanded that the system is mounted in the vicinity of an engine so as to raise the temperature earlier. However, a mounting space is limited right under the engine. When it is also considered that a filter loaded with the three-way catalyst is separately mounted, it is increasingly difficult to acquire the mounting space. When the honeycomb catalyst body of the present invention is used, these problems can be solved. That is, the honeycomb catalyst body of the present invention is very compact as compared with the existing system (an $NO_x$ purifying device).

In the honeycomb catalyst body of the present invention, the three-way catalyst is loaded onto the projecting portions extending into the inflow cells of the plugged honeycomb structure, and the $NO_x$ adsorber catalyst is loaded onto the projecting portions extending into outflow cells of the plugged honeycomb structure. Therefore, without using a plurality of honeycomb catalyst bodies (a honeycomb catalyst body loaded with the three-way catalyst and a honeycomb catalyst body loaded with the $NO_x$ adsorber catalyst), the purification of the harmful substances in the exhaust gas can suitably be performed by one honeycomb catalyst body. Moreover, the mounting space is limited right under the engine as described above, and hence the honeycomb catalyst body of the present invention is especially effective as the filter to be disposed in this limited mounting space. That is, the honeycomb catalyst body of the present invention is very compact as compared with the existing system (the $NO_x$ purifying device).

As described above, according to the honeycomb catalyst body of the present invention, the urea jet system which has heretofore been required is not required, and additionally, the plurality of honeycomb catalyst bodies which have been used can be reduced to one. Therefore, even when a containing space is limited as in a car or the like, the honeycomb catalyst body can suitably be contained. Moreover, in the honeycomb catalyst body of the present invention, a porosity of each of partition walls of the plugged honeycomb structure is from 40 to 70%. Therefore, the partition walls are comparatively dense, and hence a mechanical strength is high. Furthermore, in the honeycomb catalyst body of the present invention, a thickness of each of the projecting portions is from 30 to 140% of a thickness of each of the partition walls, and hence an initial pressure loss can be suppressed while acquiring the strength of the plugged honeycomb structure. Additionally, in the honeycomb catalyst body of the present invention, an amount of the catalyst loaded onto the partition walls in a cross section vertical to a cell extending direction is 40% or less of a total amount of the catalyst loaded onto the plugged honeycomb structure. Moreover, the amount of the catalyst to be loaded onto the partition walls is smaller than an amount of the catalyst to be loaded onto the projecting portions. Therefore, in the honeycomb catalyst body of the present invention, it is possible to suppress an increase of a pressure loss which is caused when a large amount of the catalyst is loaded onto the partition walls to close or noticeably narrow pores in the partition walls. Furthermore, in the honeycomb catalyst body of the present invention, the amount of the catalyst to be loaded onto the partition walls is decreased to prevent the increase of the pressure loss, but instead, a larger amount of the catalyst is loaded onto the projecting portions than onto the partition walls. Therefore, a purification performance is suitable.

DETAILED DESCRIPTION OF THE INVENTION

Hereinafter, embodiments of the present invention will be described. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

Figure 1:
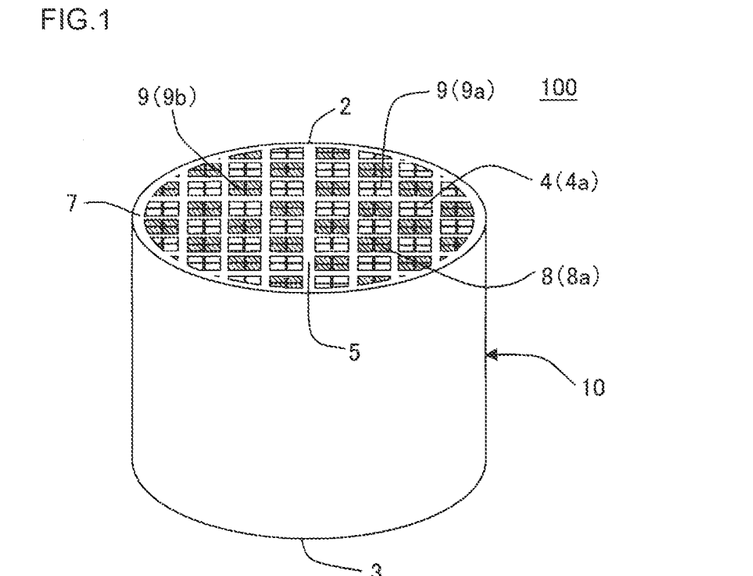
FIG. 1 is a perspective view schematically showing one embodiment of a honeycomb catalyst body of the present invention.
Figure 2:
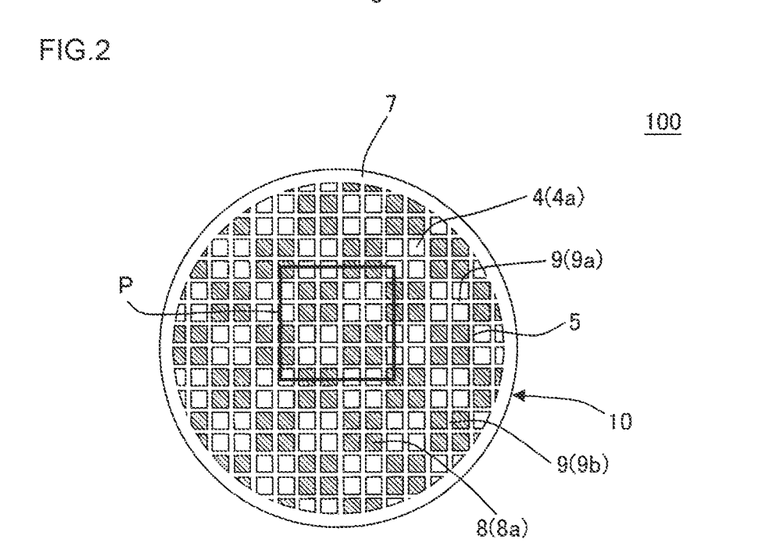
FIG. 2 is a plan view schematically showing one end surface in the one embodiment of the honeycomb catalyst body of the present invention.
Figure 3:
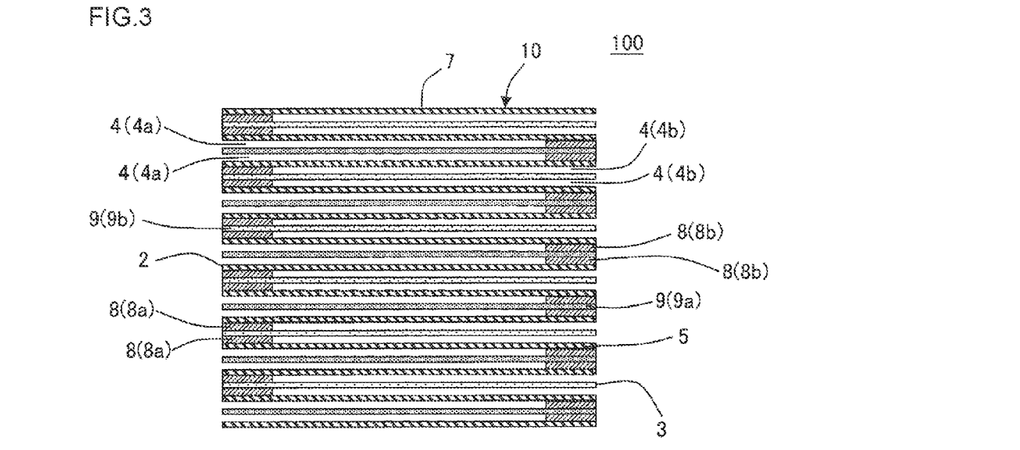
FIG. 3 is a cross sectional view schematically showing a cross section parallel to a cell extending direction in the one embodiment of the honeycomb catalyst body of the present invention.

[1] Honeycomb Catalyst Body:

As one embodiment of the honeycomb catalyst body of the present invention, a honeycomb catalyst body 100 is shown in FIG. 1 to FIG. 3. The honeycomb catalyst body 100 includes a plugged honeycomb structure 10 having partition walls 5, inflow side plugged portions 8a, outflow side plugged portions 8b, and projecting portions 9; and a catalyst loaded onto the projecting portions 9 of the plugged honeycomb structure 10. The partition walls 5 are porous partition walls which define and form a plurality of cells 4 extending from an inflow side end surface 2 to an outflow side end surface 3 to become through channels of a fluid. The inflow side plugged portions 8a are provided at ends (inflow side ends) of the predetermined cells in the inflow side end surface 2. The outflow side plugged portions 8b are provided at ends (outflow side ends) of the remaining cells in the outflow side end surface 3. The projecting portions 9 are porous portions which project so as to extend from the partition walls 5 into inflow cells 4a, that are defined as the cells provided with the outflow side plugged portions 8b, and into outflow cells 4b, that are defined as the cells provided with the inflow side plugged portions 8a, and which are formed integrally with the partition walls 5. In the honeycomb catalyst body 100, a porosity of each of the partition walls 5 of the plugged honeycomb structure 10 is from 40 to 70%. Moreover, in the honeycomb catalyst body 100, a thickness of the projecting portions 9 is from 30 to 140% of a thickness of the partition walls 5. In the honeycomb catalyst body 100, an amount of the catalyst loaded onto the partition walls 5 in a cross section vertical to an extending direction of the cells is 40% or less of a total amount of the catalyst loaded onto the plugged honeycomb structure 10. Moreover, an amount of the catalyst to be loaded onto the partition walls 5 is smaller than an amount of the catalyst to be loaded onto the projecting portions 9. Furthermore, the catalyst loaded onto the projecting portions 9(9a) extending into the inflow cells 4a of the plugged honeycomb structure 10 is a three-way catalyst or an $NO_x$ adsorber catalyst, and the catalyst loaded onto the projecting portions 9(9b) extending into the outflow cells 4b of the plugged honeycomb structure 10 is a selective reduction catalyst. It is to be noted that in the honeycomb catalyst body of the present invention, the three-way catalyst may be loaded onto the projecting portions extending into the inflow cells of the plugged honeycomb structure, and the $NO_x$ adsorber catalyst may be loaded onto the projecting portions extending into the outflow cells of the plugged honeycomb structure.

In the honeycomb catalyst body 100, plugged portions 8 (the inflow side plugged portions 8a and the outflow side plugged portions 8b) are disposed alternately in the predetermined cells and the remaining cells, so as to form a so-called checkered pattern. The plugged honeycomb structure 10 further has an outer peripheral wall 7 provided in an outer periphery. It is to be noted that the honeycomb catalyst body of the present invention does not necessarily have to have the outer peripheral wall 7.

In the honeycomb catalyst body 100, the three-way catalyst or the $NO_x$ adsorber catalyst is loaded onto the projecting portions 9 (inflow cell side projecting portions 9a) extending into the inflow cells 4a of the plugged honeycomb structure 10 and the surfaces of the partition walls 5 on an inflow cell 4a side. Either the three-way catalyst or the $NO_x$ adsorber catalyst may be used. However, when control in accordance with a theoretical air fuel ratio is mainly executed, it is preferable to select the three-way catalyst which exerts an effect in exhaust gas purification at the theoretical air fuel ratio. This is because the three-way catalyst can advantageously purify not only $NO_x$ but also HC and CO. On the other hand, when lean burn control is mainly executed, it is preferable to use the $NO_x$ adsorber catalyst, because the three-way catalyst does not function in a lean burn operation, and because emissions of $NO_x$ which often occur in the lean burn operation are suppressed. In the honeycomb catalyst body 100, the selective reduction catalyst is loaded onto the projecting portions 9 (outflow cell side projecting portions 9b) extending into the outflow cells 4b of the plugged honeycomb structure 10 and the surfaces of the partition walls 5 on an outflow cell 4b side. Therefore, without using a plurality of honeycomb catalyst bodies (a honeycomb catalyst body loaded with the three-way catalyst and a honeycomb catalyst body loaded with the selective reduction catalyst), purification of harmful substances in an exhaust gas can suitably be performed by one honeycomb catalyst body. Consequently, according to the honeycomb catalyst body 100, an urea jet system is not required as described above, and additionally, the plurality of honeycomb catalyst bodies which have heretofore been used can be reduced to one. Therefore, even when a containing space is limited as in a car or the like, the honeycomb catalyst body can suitably be contained. Furthermore, since the one honeycomb catalyst body is used, canning is not troublesome. That is, when the plurality of honeycomb catalyst bodies are used, it is necessary to perform the canning of each of the honeycomb catalyst bodies, but when the one honeycomb catalyst body is used, the canning may be performed only once.

Moreover, in the plugged honeycomb structure 10, the porosity of the partition walls 5 is from 40 to 70%. Therefore, the partition walls 5 are comparatively dense, and hence a mechanical strength is high. Furthermore, in the honeycomb catalyst body 100, the thickness of the projecting portion 9 is from 30 to 140% of the thickness of the partition wall 5. Therefore, an initial pressure loss can be suppressed while acquiring the strength of the honeycomb catalyst body 100 (the plugged honeycomb structure 10). Furthermore, in the honeycomb catalyst body 100, the amount of the catalyst loaded onto the partition walls 5 in the cross section vertical to the cell extending direction is 40% or less of the total amount of the catalyst loaded onto the plugged honeycomb structure 10. Additionally, the amount of the catalyst to be loaded onto the partition walls 5 is smaller than the amount of the catalyst to be loaded onto the projecting portions 9. Consequently, the honeycomb catalyst body 100 has small pressure loss. It is to be noted that when the amount is "smaller than the amount of the catalyst to be loaded onto the projecting portions 9", it is meant that the amount is smaller than a total of an amount of the catalyst to be loaded onto the inflow cell side projecting portions 9a and an amount of the catalyst to be loaded onto the outflow cell side projecting portions 9b.

In the honeycomb catalyst body 100, ammonia is generated from $NO_x$ and $H_2$ in the exhaust gas at rich spike by the three-way catalyst or the $NO_x$ adsorber catalyst loaded onto the inflow cell side projecting portions 9a, and the ammonia is accumulated in the selective reduction catalyst. By use of this ammonia, it is possible to purify $NO_x$ in the exhaust gas by the selective reduction catalyst. Moreover, in the honeycomb catalyst body 100, the exhaust gas which has flowed into the inflow cells 4a passes through the partition walls 5. When the exhaust gas passes through the partition walls 5, particulate materials in the exhaust gas are collected.

Here, when the catalyst is loaded onto a filter structure (the plugged honeycomb structure) capable of collecting the particulate materials, there have heretofore been employed measures to apply the catalyst to pores (air pores) in the partition walls of the filter structure and load the catalyst thereonto. However, in such a method, when the amount of the catalyst is increased for the purpose of enhancing the purification performance of the honeycomb catalyst body to be obtained, the pores in the partition walls are closed with the catalyst, or the pores are noticeably narrowed, so that the porosity of each partition wall rapidly deteriorates. Therefore, there has been the problem that the pressure loss of the filter (the honeycomb catalyst body) excessively rises. Therefore, when the amount of the catalyst is increased, there are employed measures to increase the porosity of the partition wall of the filter and acquire a space where the catalyst is loaded so that the pressure loss does not rise even when a large amount of the catalyst is loaded. However, when the porosity of the partition wall is increased, the mechanical strength of the filter deteriorates. Consequently, there has been a limit to the measures to increase the porosity of the partition wall, when actual use is taken into consideration.

Moreover, for example, when the filter includes laminated catalyst layers in which on a predetermined catalyst layer (e.g., a layer of the selective reduction catalyst (SCR)), another catalyst layer (e.g., a layer of an ammonia slip preventing catalyst (ASC)) is formed, the catalyst layers are very thin. Therefore, a distance via which the exhaust gas can come in contact with the catalyst is short. In particular, there is the defect that when a flow rate of the exhaust gas is large, removal of the exhaust gas cannot sufficiently be performed. Furthermore, the catalysts having different functions are applied into the same partition wall, and hence it is difficult to completely separate the plurality of catalyst layers. As a result, an originally expected purification performance might not be obtained. In other words, by disposing, as in the honeycomb catalyst body of the present invention, portions loaded with the three-way catalyst or the $NO_x$ adsorber catalyst away from portions loaded with the selective reduction catalyst by the partition walls therebetween, instead of forming any laminated catalyst layers, the following defects can be prevented. That is, it is possible to prevent the defect that ammonia generated at the rich spike by the three-way catalyst or the $NO_x$ adsorber catalyst is oxidized by the three-way catalyst or the $NO_x$ adsorber catalyst, and the ammonia is not used in $NO_x$ purification by the selective reduction catalyst. Moreover, in a case where the plurality of catalyst layers are laminated, the exhaust gas is purified only when the exhaust gas passes through the partition walls. However, in the honeycomb catalyst body of the present invention, when the exhaust gas passes through the partition walls, the exhaust gas is purified, but also when the exhaust gas flows through the through channels (the cells), the exhaust gas is purified by the catalyst loaded onto the projecting portions. Therefore, even when the flow rate of the exhaust gas is large, the purification performance is maintained.

Furthermore, a distribution of a flow speed of the fluid (the exhaust gas) which passes through the partition walls of the filter appears in a through channel direction. Therefore, the catalyst loaded onto a portion through which a large amount of the exhaust gas flows deteriorates earlier. Moreover, the flow speed distribution of the exhaust gas does not change when use conditions are the same, and hence it is difficult to effectively utilize the other portion (a portion other than the portion through which the large amount of the exhaust gas flows).

To solve the problem, in the honeycomb catalyst body of the present invention, portions onto which the large amount of the catalyst is loaded and which mainly assumes a catalyst function are separated from portions which collect the particulate materials mainly as a filter (the two kinds of portions are disposed in separate regions). According to such a constitution, it is possible to avoid the excessive rise of the pressure loss which is caused by loading the catalyst onto pore surfaces of the partition walls. In addition, it is possible to avoid the deterioration of the mechanical strength of the filter (the honeycomb catalyst body) which is caused by increasing the porosity for the purpose of suppressing the excessive rise.

FIG. 1 is a perspective view schematically showing one embodiment of the honeycomb catalyst body of the present invention. FIG. 2 is a plan view schematically showing one end surface in the one embodiment of the honeycomb catalyst body of the present invention. FIG. 3 is a cross sectional view schematically showing a cross section parallel to a cell extending direction in the one embodiment of the honeycomb catalyst body of the present invention.

[1-1] Plugged Honeycomb Structure:

The porosity of the partition walls 5 is from 40 to 70%, preferably from 40 to 65%, and further preferably from 40 to 60%. When the porosity of the partition wall 5 is in the above range, the rise of the pressure loss can be suppressed while acquiring a canning strength. In a case where the porosity of the partition wall 5 is smaller than 40%, a passing resistance rises when the exhaust gas passes the partition wall 5. Therefore, the pressure loss rises. In a case where the porosity is in excess of 70%, the strength of the partition wall 5 deteriorates, and hence the partition walls might be broken at the canning. For example, when the porosity is 75%, an isostatic strength of the plugged honeycomb structure is 0.3 MPa, which is very low.

The porosity of the partition wall 5 is a value measured by image analysis. Specifically, first, SEM photographs of a plurality of view fields of the partition walls of the plugged honeycomb structure in the cross section vertical to the cell extending direction are arbitrarily photographed by a scanning type electron microscope (SEM). The number of the view fields to be photographed is at least three. Moreover, in the one view field, a vertical size×a horizontal size is "p×p", when a size of one cell (a cell pitch) is "p". Next, each photographed image is binarized by the image analysis, and the image is divided into a cavity portion (i.e., a pore portion) and a portion other than the cavity portion. Next, a ratio of an area covered by the cavity portion in each image is calculated, and an average value is obtained. In this way, the porosity of the partition walls is calculated.

An average pore diameter of the partition walls 5 is preferably 25 μm or less, further preferably from 7 to 25 especially preferably from 8 to 24 μm, and most preferably from 9 to 23 μm. When the above average pore diameter is in the above range, the rise of the pressure loss can be suppressed while acquiring the function as the filter (a particulate material collecting performance). In a case where the average pore diameter of the partition walls 5 is smaller than 7 μm, the passing resistance increases when the exhaust gas passes the partition walls 5, and hence the pressure loss might rise. When the average pore diameter is in excess of 25 μm, the collecting performance of ash and the particulate materials might deteriorate. The average pore diameter of the partition walls 5 is a value measured by the image analysis in the same manner as in the porosity of the partition walls.

A thickness of the partition wall 5 is preferably from 64 to 508 μm, further preferably from 89 to 381 μm, and especially preferably from 110 to 305 μm. When the thickness of each partition wall is in the above range, there are the advantages that the strength of the honeycomb structure is maintained and that the increase of the pressure loss is suppressed. When the thickness of the partition wall 5 is smaller than 64 μm, the strength of the honeycomb structure deteriorates sometimes. When the thickness is in excess of 508 μm, the pressure loss might be high. The thickness of the partition wall 5 is a value measured by a method of observing the cross section of the honeycomb catalyst body 100 which is parallel to a central axis thereof by a microscope.

A value (L/D) calculated by a formula: (a length L of the honeycomb catalyst body in a central axis direction/a diameter D of the end surface of the honeycomb catalyst body) is preferably from 0.5 to 2, further preferably from 0.6 to 1.7, and especially preferably from 0.7 to 1.6. When the above value (L/D) is in the above range, ring cracks can be suppressed.

A shape of the cell 4 is a quadrangular shape in a cross section vertical to the cell extending direction. There is not any special restriction on the shape of the cell 4, and examples of the shape include polygonal shapes such as a triangular shape and an octagonal shape in addition to the quadrangular shape, a round shape, and an elliptic shape.

There is not any special restriction on a thickness of the outer peripheral wall 7. The thickness of the outer peripheral wall 7 is preferably from 0.1 to 8 mm, further preferably from 0.2 to 7 mm, and especially preferably from 0.3 to 6 mm. When the thickness of the outer peripheral wall 7 is in the above range, a heat stress generated by a difference in heat capacity between the outer peripheral wall 7 and the partition wall 5 can be small while acquiring the strength of the outer peripheral wall 7.

There is not any special restriction on a shape of the plugged honeycomb structure 10 (the honeycomb catalyst body 100). The shape is preferably a cylindrical shape, a tubular shape with an elliptic bottom surface, a tubular shape with a bottom surface having a polygonal shape such as a quadrangular shape, a pentangular shape or a hexagonal shape, or the like, and the shape is further preferably the cylindrical shape. Moreover, there is not any special restriction on a size of the plugged honeycomb structure 10 (the honeycomb catalyst body 100). A length of the structure in the cell extending direction is preferably from 50 to 381 mm. Moreover, when an outer shape of the plugged honeycomb structure 10 (the honeycomb catalyst body 100) is, for example, the cylindrical shape, a diameter of a bottom surface of the shape is preferably from 50 to 381 mm.

The partition walls 5 and the outer peripheral wall 7 preferably contain a ceramic material as a main component. A material of the partition walls 5 and the outer peripheral wall 7 is, for example, preferably at least one selected from the following group. That is, the material is preferably at least one selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When the material is cordierite, it is possible to obtain the plugged honeycomb structure having small thermal expansion coefficient and excellent heat shock resistance. The material of the partition walls 5 is preferably the same as that of the outer peripheral wall 7. It is to be noted that the material of the partition walls 5 may be different from that of the outer peripheral wall 7. When the walls "contain the ceramic material as the main component", it is meant that a content of the ceramic material is 90 mass or more of the whole material.

The projecting portions 9 are the porous portions which project so as to extend from the partition walls 5 into the inflow cells 4a, that are defined as the cells provided with the outflow side plugged portions 8b, and into the outflow cells 4b, that are defined as the cells provided with the inflow side plugged portions 8a, and which are formed integrally with the partition walls 5. A shape of the projecting portion extending into the inflow cell may be the same as that of the projecting portion extending into the outflow cell, or may be different therefrom. That is, for example, the projecting portion extending into the inflow cell may be a partition wall which defines and forms a small cell described later, and the projecting portion extending into the outflow cell may be in the form of a protrusion.

Figure 4:
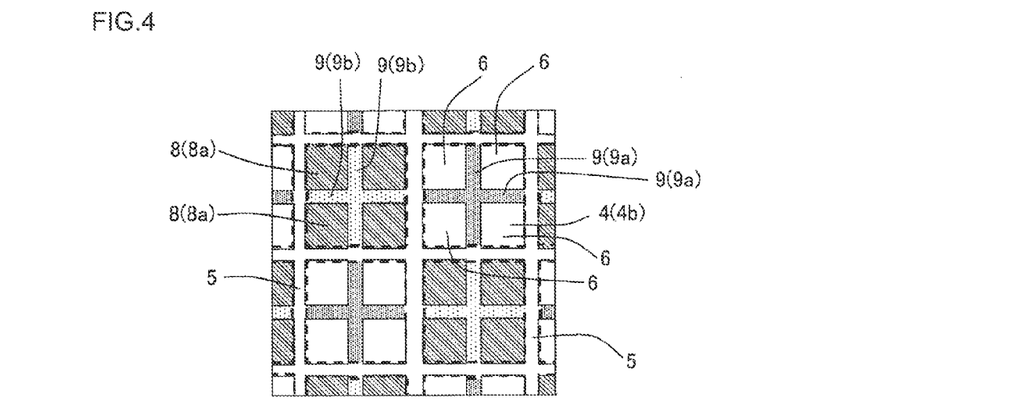
FIG. 4 is a plan view schematically showing an enlarged part of the one end surface in the one embodiment of the honeycomb catalyst body of the present invention.

The projecting portion 9 (9a or 9b) is preferably a partition wall which partitions the cell 4 to form a plurality of cells (small cells 6 (see FIG. 4)) as in the honeycomb catalyst body 100 shown in FIG. 1 to FIG. 4. In the honeycomb catalyst body 100, the projecting portions 9 have the above constitution, so that the strength of the honeycomb structure can be enhanced, and the honeycomb catalyst body can be manufactured without changing conventional manufacturing steps and jigs. FIG. 4 is a plan view schematically showing an enlarged region P of part of the one end surface in the one embodiment of the honeycomb catalyst body of the present invention. Each portion surrounded with a broken line shown in FIG. 4 shows the cell 4 defined and formed by the partition walls 5. Each of the projecting portions 9 projects so as to extend from the partition wall 5 into the cell 4. FIG. 4 shows an example where each of the cells 4 is partitioned by partition walls constituted of the projecting portions 9 to form the four small cells 6. In the honeycomb catalyst body 100 of the one embodiment of the honeycomb catalyst body of the present invention, the amount of the catalyst loaded onto the partition walls 5 in the cross section vertical to the extending direction of the cells 4 is 40% or less of the total amount of the catalyst loaded onto the plugged honeycomb structure 10. Moreover, the catalyst is positively loaded onto the surfaces of the partition walls (the projecting portions 9) which define and form the small cells 6, and the pore surfaces thereof.

Figure 5:
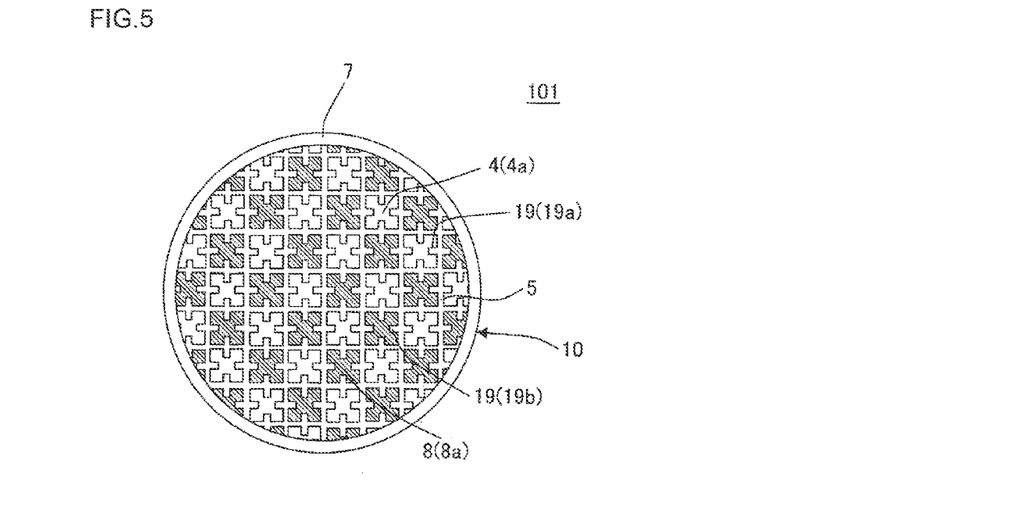
FIG. 5 is a plan view schematically showing one end surface in another embodiment of the honeycomb catalyst body of the present invention.

Moreover, each projecting portion is preferably in the form of a protrusion (a protrusion-like projecting portion 19 (19a or 19b)) projecting from the surface of a partition wall 5 as in a honeycomb catalyst body 101 shown in FIG. 5. In this way, the projecting portion is in the form of the protrusion, and hence the initial pressure loss can be decreased. The protrusion-like projecting portion 19a is the projecting portion extending into an inflow cell 4a of a plugged honeycomb structure 10, and the protrusion-like projecting portion 19b is the projecting portion extending into an outflow cell 4b of the plugged honeycomb structure 10.

There is not any special restriction on the number of the protrusion-like projecting portions 19, a size of the protrusion-like projecting portions and the like. The number of the protrusion-like projecting portions 19 is preferably from 1 to 8 per cell, and further preferably from 2 to 4 per cell. When the number of the protrusion-like projecting portions 19 is in the above range, a distance between the projecting portions can be acquired. Consequently, there are the advantages that a catalyst coat can be formed without burying the catalyst in a space between the projecting portions and that a geometric surface area which influences the exhaust gas purification performance can be acquired. Moreover, a size of the protrusion-like projecting portions 19 is preferably a distance of 10 to 80%, and further preferably a distance of 30 to 70% of a distance from a center of gravity of the cell to the partition wall (i.e., a length of a normal dropped from the center of gravity of the cell to the partition wall). When the size of the protrusion-like projecting portion 19 is in the above range, the projecting portions can more easily be coated with the catalyst than the partition walls, thereby producing the advantage that the rise of the pressure loss after the catalyst coating can be suppressed. Here, "the size of the protrusion-like projecting portion" is a height thereof from the partition wall. "The center of gravity of the cell" is defined by the center of gravity in a shape of an open frontal area of the cell. For example, the honeycomb catalyst body 101 shown in FIG. 5 is an example where the one protrusion-like projecting portion 19 extends from each partition wall, and the four protrusion-like projecting portions 19 extend into the one cell 4. According to such a constitution, the projecting portions can be manufactured by a simple change of a jig for use in the conventional manufacturing steps.

A thickness of the projecting portions is from 30 to 140%, preferably from 30 to 130%, and further preferably from 30 to 120% of a thickness of the partition walls. When the thickness of the projecting portion is in the above range, the initial pressure loss can be suppressed while acquiring the strength of the plugged honeycomb structure. When the thickness of the projecting portion is smaller than 30% of the thickness of the partition wall, the strength of the plugged honeycomb structure deteriorates, and hence the plugged honeycomb structure is broken at the canning. When the percentage is in excess of 140%, the initial pressure loss increases. Here, the thickness of the projecting portion is preferably small, from the viewpoint that the increase of the pressure loss can be prevented. The partition walls and the projecting portions are usually simultaneously formed by extrusion forming. Therefore, when a difference in thickness between the partition wall and the partition wall constituted of the projecting portion is large, a difference in flow speed is made between the partition wall and the projecting portion in an extruded kneaded material. As a result, the partition walls and the projecting portions are deformed into an undulated shape in the cell extending direction. Such deformation of the partition walls and projecting portions remarkably deteriorates the strength. Therefore, the thickness of each projecting portion needs to satisfy the above range (especially the above lower limit value) in a relation between the projecting portion and the partition wall. It is to be noted that the thickness of the projecting portion means a thickness of the thickest portion of a partition wall, when the projecting portion is the partition wall which partitions the cell to form a plurality of cells. Moreover, when the projecting portion is in the form of the protrusion, the thickness of the projecting portion means a maximum width of the above projecting portion in a cross section vertical to a cell extending direction.

It is to be noted that the thickness of the projecting portion extending into the inflow cell of the plugged honeycomb structure (an inflow cell side projecting portion) may be different from the thickness of the projecting portion extending into the outflow cell of the plugged honeycomb structure (an outflow cell side projecting portion). Moreover, the thickness of the inflow cell side projecting portion may be the same as that of the outflow cell side projecting portion.

As a porosity and an average pore diameter of the projecting portions, it is possible to employ ranges similar to those of the above-mentioned porosity and average pore diameter of the partition walls. The ranges of the porosity and average pore diameter of the projecting portions are preferably the same as those of the partition walls.

An example of a material of the plugged portions (the inflow side plugged portions and the outflow side plugged portions) is the same as that of the partition walls 5. It is preferable to use the same material as in the partition walls 5.

A cell density of the plugged honeycomb structure 10 is calculated as follows, when the projecting portions are in the form of a protrusion. That is, in the cross section vertical to the cell extending direction, a line segment connecting start points of the opposed protrusion-like projecting portions to each other is assumed (when a plurality of line segments are drawn, the longest line segment is employed), and a virtual partition wall is considered to be present at a position of this line segment, to calculate the cell density. It is to be noted that when each projecting portion is in the form of the wall, a small cell is regarded as one cell, to calculate the cell density.

The cell density of the plugged honeycomb structure 10 is preferably from 15.5 to 93 cells/cm$^2$, further preferably from 31 to 77.5 cells/cm$^2$, and especially preferably from 46.5 to 62 cells/cm$^2$. When the above cell density is in the above range, there is the advantage that the rise of the pressure loss can be suppressed while acquiring the strength of the honeycomb structure. When the cell density of the plugged honeycomb structure 10 is smaller than 15.5 cells/cm$^2$, a honeycomb strength deteriorates, which might cause the defect that the plugged honeycomb structure breaks at the canning. When the cell density is in excess of 93 cells/cm$^2$, the pressure loss rises, which might cause the defect that a fuel efficiency deteriorates.

[1-2] Catalyst:

The amount of the catalyst loaded onto the partition walls 5 in the cross section of the plugged honeycomb structure 10 which is vertical to the extending direction of the cells 4 is 40% or less of the total amount of the catalyst loaded onto the plugged honeycomb structure 10. Consequently, in the honeycomb catalyst body 100, a larger amount of the catalyst is loaded onto the projecting portions 9 than onto the partition wall 5. The amount of the catalyst to be applied to the partition walls 5 is 40% or less, preferably 30% or less, and further preferably 20% or less of the total amount of the catalyst to be applied to the honeycomb structure 10. When the amount of the catalyst to be applied to the partition walls 5 is in excess of 40% of the total amount of the catalyst to be applied to the honeycomb structure 10, the pressure loss increases in a case where a suitable purification efficiency is maintained. Moreover, a performance of the plugged honeycomb structure 10 (a pressure loss increase prevention effect) is the best in a state where a catalyst coat is not substantially present on the partition walls 5 (the catalyst is not substantially loaded onto the partition walls 5). That is, when the catalyst coat is not substantially present on the partition walls 5, through channels of the exhaust gas passing through the partition walls are sufficiently acquired. Therefore, the increase of the pressure loss can be prevented. In this case, "the state where the catalyst coat is not substantially present" means a case where the amount of the catalyst applied to (loaded onto) the partition walls 5 is 5% or less of the total amount of the catalyst applied to (loaded onto) the plugged honeycomb structure 10 (including a case where the catalyst is not loaded onto the partition walls 5).

The amount of the catalyst loaded onto the partition walls and the projecting portions (the catalyst amount) is measured by the image analysis in the same manner as in a measuring method of the porosity. That is, "the amount of the catalyst" is a size of an area of the catalyst which is calculated by the image analysis. Specifically, first in an arbitrary cross section of the honeycomb catalyst body which is vertical to a central axis (the cell extending direction), the image analysis is performed, to binarize a base material portion corresponding to the partition walls and the projecting portions, and a portion corresponding to the catalyst. Next, an area of the catalyst loaded onto the projecting portions and an area of the catalyst loaded onto the partition walls are calculated as the catalyst amounts in the respective portions.

Consequently, in the honeycomb catalyst body of the present invention, the portions which have less amount of the catalyst to be loaded and which function as filters to collect particulate materials (the partition walls) and the portions onto which a large amount of the catalyst is positively loaded and which purify harmful substances in the exhaust gas (the projecting portions) are present in separate regions, respectively. Therefore, for the partition walls which function as the filters, it is not necessary to consider that the catalyst is loaded as in the conventional honeycomb catalyst body. Consequently, the porosity can be small. As a result, the mechanical strength of the honeycomb catalyst body can be enhanced.

In the honeycomb catalyst body of the present invention, as described above, the three-way catalyst may be loaded onto the projecting portions extending into the inflow cells of the plugged honeycomb structure, and the $NO_x$ adsorber catalyst may be loaded onto the projecting portions projecting into the outflow cells of the plugged honeycomb structure. The catalysts are loaded in this manner, so that heat generated by a reaction in the three-way catalyst can directly be used in the $NO_x$ adsorber catalyst. That is, the projecting portions loaded with the $NO_x$ adsorber catalyst are disposed close to the projecting portions provided with the three-way catalyst. Specifically, these projecting portions have such a relation that the projecting portions are positioned on a front surface side and a back surface side of one partition wall. Therefore, the heat generated by the reaction in the three-way catalyst immediately travels to the $NO_x$ adsorber catalyst, and the $NO_x$ adsorber catalyst is warmed earlier, so that the $NO_x$ adsorber catalyst can be activated immediately after the start of the operation (i.e., at an early stage). As a result, the exhaust gas can suitably be purified immediately after the start of the operation.

It is to be noted that the honeycomb catalyst body loaded with each catalyst in this manner is effective especially in the following case. That is, when the lean burn control is executed in an engine of a gasoline direct injection type, the $NO_x$ adsorber catalyst (NSC) to purify and treat $NO_x$ is required in addition to a catalyst such as the three-way catalyst. However, in a car or the like, miniaturization of the mounting space of the filter or the like has been advanced. Moreover, there is a limit to the mounting space of the filter or the like in an engine room of the car or the like. It is to be noted that under a floor of the car or the like, the mounting space is comparatively easily acquired as compared with the engine room, but there is the problem that heat required for the $NO_x$ adsorber catalyst to exert a function cannot easily be obtained (a temperature of the exhaust gas to heat the $NO_x$ adsorber catalyst is low). According to the present invention, such problems can suitably be solved.

[2] Manufacturing Method of Honeycomb Catalyst Body of the Present Invention:

The honeycomb catalyst body of the present invention can be manufactured as follows. That is, first, a kneaded material obtained by kneading a forming raw material containing a ceramic raw material is extruded and formed into a honeycomb shape to prepare a formed honeycomb body (a formed honeycomb body preparing step). Next, a plugging material is filled into open frontal areas of cells of the prepared formed honeycomb body to prepare a plugged formed honeycomb body (a plugging step). Next, the prepared plugged formed honeycomb body is fired, to prepare a plugged honeycomb structure in which porous plugged portions are provided at one end of each of the predetermined cells and the other end of each of the remaining cells (a plugged honeycomb structure preparing step). Next, the catalyst is loaded onto the prepared plugged honeycomb structure to prepare the honeycomb catalyst body (a catalyst loading step).

According to such a honeycomb catalyst body manufacturing method, the honeycomb catalyst body of the present invention can suitably be manufactured.

[2-1] Formed Honeycomb Body Preparing Step:

In the present step, the kneaded material obtained by kneading the forming raw material is extruded and formed into the honeycomb shape to obtain the formed honeycomb body. The open frontal areas of the predetermined cells in one end surface of the obtained formed honeycomb body are plugged, and then fired. In this way, the plugged honeycomb structure can be prepared.

The forming raw material is preferably a ceramic raw material to which a dispersion medium and an additive have been added. Examples of the additive include an organic binder, a pore former, and a surfactant. An example of the dispersion medium is water.

The ceramic raw material is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these materials, the cordierite forming raw material having less thermal expansion coefficient and excellent heat shock resistance is preferable.

Examples of the organic binder include methylcellulose, hydroxypropoxyl cellulose, hydroxyethyl cellulose, carboxymethylcellulose, polyvinyl alcohol and the like. Among these binders, methylcellulose and hydroxypropoxyl cellulose are preferably used together. A content of the organic binder is preferably from 0.2 to 2 parts by mass to 100 parts by mass of the ceramic raw material.

There is not any special restriction on the pore former, as long as the pores are formed after the firing. Examples of the pore former include starch, resin balloons, a water-absorbing resin, silica gel and the like. A content of the pore former is preferably from 5 to 15 parts by mass to 100 parts by mass of the ceramic raw material.

As the surfactant, ethylene glycol, dextrin, fatty acid soap, polyalcohol and the like can be used. One of these surfactants may be used alone, or a combination of two or more of the surfactants may be used. A content of the surfactant is preferably from 0.1 to 2 parts by mass to 100 parts by mass of the ceramic raw material.

A content of the dispersion medium is preferably from 10 to 30 parts by mass to 100 parts by mass of the ceramic raw material.

A porous base material having a desirable porosity and average pore diameter can be obtained by regulating particle diameters of the ceramic raw material (aggregate particles) for use, an amount of the material to be blended, particle diameters of the pore former to be added, and an amount of the pore former to be blended.

There is not any special restriction on a method of kneading the forming raw material to form the kneaded material. An example of the method is a method using a kneader, a vacuum clay kneader or the like. The extrusion-forming can be performed by using a die from which a desirable cell shape, partition wall thickness and cell density can be obtained. A material of the die is preferably a hard metal which does not easily wear away.

[2-2] Plugging Step:

In the present step, the plugging material is filled into the open frontal areas of the cells of the prepared formed honeycomb body to prepare the plugged formed honeycomb body.

As the forming raw material containing the ceramic raw material included in the plugging material, it is possible to use the same as the forming raw material containing the ceramic raw material which is the raw material of the kneaded material to form the formed honeycomb body.

As a method of filling the plugging material into the open frontal areas of the cells, a heretofore known method can suitably be employed. For example, first, a mask is attached to one end surface of the formed honeycomb body. Next, holes are made in portions of the mask which close the predetermined cells, by known means such as laser. Next, the above plugging material is filled into one end of each predetermined cell of the formed honeycomb body at which the holes are made in the mask. Next, a mask is attached to the other end surface of the formed honeycomb body. Next, holes are made in portions of the mask which close the remaining cells, by known means such as the laser. Next, the above plugging material is filled into the other end of each remaining cell of the formed honeycomb body at which the holes are made in the mask. It is to be noted that the cordierite forming raw material is obtained by blending respective components so as to obtain a theoretical composition of cordierite crystals. The above cordierite forming raw material is specifically obtained by blending a silica source component, a magnesia source component, an alumina source component and the like.

[2-3] Plugged Honeycomb Structure Preparing Step:

A firing temperature can suitably be determined in accordance with the material of the formed honeycomb body. When the material of the formed honeycomb body is, for example, cordierite, the firing temperature is preferably from 1380 to 1450° C., and further preferably from 1400 to 1440° C. Moreover, a firing time is preferably from about three to ten hours.

The formed honeycomb body may be dried prior to the firing. There is not any special restriction on a drying method. Examples of the drying method include hot air drying, microwave drying, dielectric drying, reduced-pressure drying, vacuum drying, and freeze-drying. Above all, the dielectric drying, the microwave drying, the hot air drying or any combination of these methods is preferably performed. Moreover, drying conditions are preferably a drying temperature of 30 to 150° C. and a drying time of one minute to two hours.

It is to be noted that the formed honeycomb body may be fired to obtain a fired honeycomb body, and then the plugging material may be filled into ends of predetermined cells of the fired honeycomb body on one end surface side.

[2-4] Catalyst Loading Step:

Next, the plugged honeycomb structure is immersed into a catalyst slurry containing the three-way catalyst or the $NO_x$ adsorber catalyst in order from one end side of the plugged honeycomb structure, and simultaneously, air is supplied into the above plugged honeycomb structure from the other end surface side of the plugged honeycomb structure. In this way, a catalyst coating layer made of the above catalyst slurry is formed on the projecting portions projecting into the inflow cells (the inflow cell side projecting portions) so that the partition walls are not coated with the catalyst as much as possible. Afterward, the air is sprayed into the cells of the plugged honeycomb structure from the above other end surface side, to blow and fly the catalyst slurry which has entered the pores of the partition walls.

Next, the plugged honeycomb structure is immersed into a catalyst slurry containing the selective reduction catalyst in order from the other end side of the plugged honeycomb structure, and simultaneously, the air is supplied into the above plugged honeycomb structure from the one end surface side of the plugged honeycomb structure. In this way, the catalyst coating layer made of the above catalyst slurry is formed on the projecting portions projecting into the outflow cells (the outflow cell side projecting portions) so that the partition walls are not coated with the catalyst as much as possible. Afterward, the air is sprayed into the cells of the plugged honeycomb structure from the above one end surface side, to blow and fly the catalyst slurry which has entered the pores of the partition walls.

Afterward, the catalyst coating layer formed on this plugged honeycomb structure is dried and fired, thereby manufacturing the honeycomb catalyst body.

Moreover, the catalyst may be loaded as follows. That is, first, the plugged honeycomb structure is immersed into a temporary filling slurry containing a compound volatilized by applying heat thereto, prior to the application of the catalyst slurry. In this way, the above temporary filling slurry is filled into the pores of the partition walls of the plugged honeycomb structure.

Next, the respective catalyst slurries (the catalyst slurry containing the three-way catalyst or the $NO_x$ adsorber catalyst and the catalyst slurry containing the selective reduction catalyst) are filled into the inflow cells and the outflow cells from one end surface and the other end surface of the plugged honeycomb structure, respectively. In this way, the catalyst coating layers made of the above catalyst slurries are formed on the surfaces of the inflow cells and the outflow cells, the surfaces of the projecting portions projecting into these inflow cells and outflow cells and the surfaces of the pores of the projecting portions.

Next, the plugged honeycomb structure is dried and fired, to volatilize the above temporary filling slurry filled into the pores of the partition walls and form the pores in the partition walls. The air is sprayed into the cells from the end surface of the plugged honeycomb structure, to blow and fly the catalyst slurry adhering to the partition wall surfaces. In this way, the honeycomb catalyst body can be prepared.

EXAMPLES

Hereinafter, the present invention will specifically be described with respect to examples, but the present invention is not limited to these examples.

Example 1

As cordierite forming raw materials, alumina, aluminum hydroxide, kaolin, talc and silica were used. To 100 parts by mass of this cordierite forming raw material, 20 parts by mass of a dispersion medium, 1 part by mass of an organic binder and 0.5 part by mass of a dispersant were added, respectively, and the materials were mixed and kneaded to prepare a kneaded material. As the dispersion medium, water was used. As the organic binder, hydroxypropyl methylcellulose was used, and as the dispersant, ethylene glycol was used.

Next, the kneaded material was extruded and formed by using a predetermined die, to prepare a formed honeycomb body having partition walls which defined and formed a plurality of cells extending through the formed honeycomb body from one end surface to the other end surface, and projecting portions which projected so as to extend from the partition walls into cells and which were formed integrally with the partition walls. The projecting portions were partition walls which partitioned each cell defined and formed by the partition walls to further form four cells (small cells). In the formed honeycomb body, a cell shape in a cross section vertical to a cell extending direction was a quadrangular shape, and the whole shape was a columnar shape. Next, the prepared formed honeycomb body was dried by a microwave drier, and further completely dried by a hot air drier to obtain a dried formed honeycomb body (the dried honeycomb body). Afterward, both ends of the dried honeycomb body were cut to obtain a predetermined dimension. Next, a mask was attached to one end surface of the dried honeycomb body. At this time, all open frontal areas of the cells were closed with the mask. Next, the mask was irradiated with laser, to make holes in predetermined portions of the mask (i.e., portions which closed the predetermined cells).

Next, an end of this dried honeycomb body to which the mask was attached (one end) was immersed into a plugging slurry, to fill the above plugging material slurry into the one end of each predetermined cell. The plugging material slurry made of the same raw material as the above kneaded material was used.

Next, a mask was attached to the other end surface of the dried honeycomb body. At this time, all open frontal areas of the cells were closed with the mask. Next, the mask was irradiated with the laser, to make holes in predetermined portions of the mask (i.e., portions which closed the remaining cells).

Next, an end of this dried honeycomb body to which the mask was attached (the other end) was immersed into the plugging slurry, to fill the above plugging material slurry into the other end of each remaining cell.

Next, the dried honeycomb body, into which the above plugging material slurry was filled, was dried by a hot air drier. Afterward, the dried honeycomb body was fired at 1410 to 1440° C. for five hours. In this way, the plugged honeycomb structure was prepared.

The obtained plugged honeycomb structure had a diameter of 157.5 mm, and a length of 152.4 mm in a central axis direction. Moreover, a volume was 2.97 liters. A value (L/D) of a ratio of a length L in the central axis direction to a diameter D of the plugged honeycomb structure was 0.97. A cell density of the plugged honeycomb structure was 46.5 cells/cm$^2$. A thickness of the partition walls was 0.15 mm. A porosity of the partition walls was 48%. An average pore diameter of the partition walls was 12 μm. A thickness of the projecting portions was 0.15 mm. A porosity of the projecting portions was 48%. An average pore diameter of the projecting portions was 12 μm. The results are shown in Table 1.

Next, each catalyst ("a three-way catalyst or an NO$_x$ adsorber catalyst" or a selective reduction catalyst) was loaded onto the obtained plugged honeycomb structure. Specifically, the plugged honeycomb structure was immersed into the catalyst slurry containing the three-way catalyst (TWC) in order from one end of the plugged honeycomb structure, and simultaneously, air was supplied into the above plugged honeycomb structure from the other end surface side of the plugged honeycomb structure. Afterward, air was sprayed into the cells from the other end surface side of the plugged honeycomb structure, thereby blowing and flying the catalyst which entered the partition walls.

Next, the plugged honeycomb structure was immersed into the catalyst slurry containing the selective reduction catalyst (SCR) in order from the other end of the plugged honeycomb structure, and simultaneously, the air was supplied into the above plugged honeycomb structure from the one end surface side of the plugged honeycomb structure. Afterward, the air was sprayed into the cells from the one end surface side of the plugged honeycomb structure, thereby blowing and flying a part of the catalyst which entered the partition walls.

In this way, catalyst coating layers were formed on the surfaces of projecting portions projecting into inflow cells, the surfaces of projecting portions projecting into outflow cells and the surfaces of pores. Afterward, the catalyst coating layers of the plugged honeycomb structure were dried and fired to obtain a honeycomb catalyst body.

Afterward, on an upstream side of the obtained honeycomb catalyst body, a three-way catalyst body loaded with the three-way catalyst (TWC) (described as "TWC" in Table 1) was disposed, to prepare an exhaust gas purifying device. A length of the exhaust gas purifying device was 266.7 mm, an initial pressure loss of the whole exhaust gas purifying device was 6.43 kPa, and a pressure loss with soot was 9.55 kPa. Moreover, a TWC total amount of the whole exhaust gas purifying device (the three-way catalyst body loaded with the three-way catalyst+the three-way catalyst in partition walls of a hybrid filter+the three-way catalyst of projecting portions projecting into inflow cells of the hybrid filter) was 448 g. Furthermore, an SCR total amount of the whole exhaust gas purifying device (the three-way catalyst in the partition walls of the hybrid filter+the selective reduction catalyst of projecting portions projecting into outflow cells of the hybrid filter) was 369 g.

The three-way catalyst body had a diameter of 105.7 mm, and a length of 114.3 mm in a central axis direction. Moreover, a volume was 1.00 liter. The initial pressure loss and the pressure loss with the soot were 3.57 kPa. An amount of the catalyst to be loaded was 201 g.

In the obtained honeycomb catalyst body (described as "the hybrid filter" in Table 1), an amount of the catalyst loaded onto partition walls in a cross section vertical to a cell extending direction was 5% or less of the total amount of the catalyst loaded onto a plugged honeycomb structure (described as "a partition wall coat ratio (%)" in Table 5). Additionally, the initial pressure loss of the honeycomb catalyst body was 2.9 kPa, and the pressure loss with the soot was 6.0 kPa. An amount of TWC loaded (the amount of the loaded catalyst) in the obtained honeycomb catalyst body was 236 g, and an amount of the SCR catalyst loaded (the amount of the loaded catalyst) in the obtained honeycomb catalyst body was 350 g.

TABLE 1

| | Example 1 | | | | Example 2 | | | | Example 3 | | | |
| | | Hybrid filter | | | | Hybrid filter | | | | Hybrid filter | | |
| | TWC | Partition wall | TWC | SCR | TWC | Partition wall | TWC | SCR | TWC | Partition wall | TWC | SCR |
| --- | --- | --- | --- | --- | --- | --- | --- | --- | --- | --- | --- | --- |
| Diameter (mm) | 105.7 | 157.5 | | | 105.7 | 157.5 | | | 105.7 | 157.5 | | |
| Length (mm) | 114.3 | 152.4 | | | 114.3 | 152.4 | | | 114.3 | 152.4 | | |
| Volume (L) | 1.00 | 2.97 | | | 1.00 | 2.97 | | | 1.00 | 2.97 | | |
| Initial pressure loss (kPa) | 3.57 | 2.86 | | | 3.57 | 2.81 | | | 3.57 | 3.02 | | |
| Pressure loss with soot (kPa) | 3.57 | 5.98 | | | 3.57 | 7.95 | | | 3.57 | 7.17 | | |
| Amount of loaded catalyst (g) | 201 | 30 | 236 | 350 | 201 | 246 | 149 | 221 | 201 | 30 | 236 | 350 |
| Length of exhaust gas purifying device (mm) | | 266.7 | | | | 266.7 | | | | 266.7 | | |
| Initial pressure loss of device (kPa) | | 6.43 | | | | 6.38 | | | | 6.59 | | |
| Pressure loss of device with soot (kPa) | | 9.55 | | | | 11.52 | | | | 10.74 | | |
| TWC total amount (g) | | 448 | | | | 448 | | | | 448 | | |
| SCR total amount (g) | | 369 | | | | 369 | | | | 369 | | |
| Isostatic strength (MPa) | — | 3.2 | | | — | 3.4 | | | — | 3.4 | | |
| Collecting efficiency (%) | — | 97.5 | | | — | 98.8 | | | — | 96.9 | | |

"Usual" in a column of "structure" in Table 5 means a honeycomb catalyst body in which a catalyst is also loaded onto pore surfaces of partition walls and which does not have any projecting portions. "Hybrid wall" means that the honeycomb catalyst body has the projecting portions and that the projecting portions are partition walls which further partition each cell to further define and form a plurality of cells (small cells).

TABLE 2

|  | Example 4 | | | | Example 5 | | | | Example 6 | | | |
|  | | Hybrid filter | | | | Hybrid filter | | | | Hybrid filter | | |
|  | TWC | Partition wall | TWC | SCR | TWC | Partition wall | TWC | SCR | TWC | Partition wall | TWC | SCR |
| --- | --- | --- | --- | --- | --- | --- | --- | --- | --- | --- | --- | --- |
| Diameter (mm) | 105.7 | 157.5 | | | 105.7 | 157.5 | | | 105.7 | 157.5 | | |
| Length (mm) | 114.3 | 152.4 | | | 114.3 | 152.4 | | | 114.3 | 152.4 | | |
| Volume (L) | 1.00 | 2.97 | | | 1.00 | 2.97 | | | 1.00 | 2.97 | | |
| Initial pressure loss (kPa) | 3.57 | 2.12 | | | 3.57 | 3.29 | | | 3.57 | 2.76 | | |
| Pressure loss with soot (kPa) | 3.57 | 5.24 | | | 3.57 | 6.41 | | | 3.57 | 5.14 | | |
| Amount of loaded catalyst (g) | 201 | 30 | 236 | 350 | 201 | 30 | 236 | 350 | 201 | 30 | 236 | 350 |
| Length of exhaust gas purifying device (mm) | | 266.7 | | | | 266.7 | | | | 266.7 | | |
| Initial pressure loss of device (kPa) | | 5.69 | | | | 6.86 | | | | 6.33 | | |
| Pressure loss of device with soot (kPa) | | 8.81 | | | | 9.98 | | | | 8.71 | | |
| TWC total amount (g) | | 448 | | | | 448 | | | | 448 | | |
| SCR total amount (g) | | 369 | | | | 369 | | | | 369 | | |
| Isostatic strength (MPa) | — | 1.2 | | | — | 4.3 | | | — | 3.1 | | |
| Collecting efficiency (%) | — | 97.5 | | | — | 97.5 | | | — | 89.2 | | |

TABLE 3

|  | Comparative Example 1 | | | Comparative Example 2 | | | |
|  | | | | | Hybrid filter | | |
|  | TWC | GPF | SCR | TWC | Partition wall | TWC | SCR |
| --- | --- | --- | --- | --- | --- | --- | --- |
| Diameter (mm) | 105.7 | 143.8 | 143.8 | 105.7 | 157.5 | | |
| Length (mm) | 114.3 | 152.4 | 130 | 114.3 | 152.4 | | |
| Volume (L) | 1.00 | 2.48 | 2.11 | 1.00 | 2.97 | | |
| Initial pressure loss (kPa) | 3.57 | 3.44 | 1.38 | 3.57 | 2.83 | | |
| Pressure loss with soot (kPa) | 3.57 | 9.57 | 1.38 | 3.57 | 8.48 | | |
| Amount of loaded catalyst (g) | 201 | 248 | 369 | 201 | 308 | 124 | 185 |
| Length of exhaust gas purifying device (mm) | | 396.7 | | | 266.7 | | |
| Initial pressure loss of device (kPa) | | 8.39 | | | 6.4 | | |
| Pressure loss of device with soot (kPa) | | 14.52 | | | 12.05 | | |
| TWC total amount (g) | | 448 | | | 448 | | |
| SCR total amount (g) | | 369 | | | 369 | | |
| Isostatic strength (MPa) | — | 2.9 | — | — | 3.6 | | |
| Collecting efficiency (%) | — | 97.6 | — | — | 99.2 | | |

|  | Comparative Example 3 | | | | Comparative Example 4 | | | |
|  | | Hybrid filter | | | | Hybrid filter | | |
|  | TWC | Partition wall | TWC | SCR | TWC | Partition wall | TWC | SCR |
| --- | --- | --- | --- | --- | --- | --- | --- | --- |
| Diameter (mm) | 105.7 | 157.5 | | | 105.7 | 157.5 | | |
| Length (mm) | 114.3 | 152.4 | | | 114.3 | 152.4 | | |
| Volume (L) | 1.00 | 2.97 | | | 1.00 | 2.97 | | |
| Initial pressure loss (kPa) | 3.57 | 3.29 | | | 3.57 | 2.04 | | |
| Pressure loss with soot (kPa) | 3.57 | 9.22 | | | 3.57 | 5.16 | | |
| Amount of loaded catalyst (g) | 201 | 30 | 236 | 350 | 201 | 30 | 236 | 350 |
| Length of exhaust gas purifying device (mm) | | 266.7 | | | | 266.7 | | |
| Initial pressure loss of device (kPa) | | 6.86 | | | | 5.61 | | |
| Pressure loss of device with soot (kPa) | | 12.79 | | | | 8.73 | | |
| TWC total amount (g) | | 448 | | | | 448 | | |
| SCR total amount (g) | | 369 | | | | 369 | | |
| Isostatic strength (MPa) | — | 5.7 | | | — | 0.5 | | |
| Collecting efficiency (%) | — | 96.1 | | | — | 97.5 | | |

TABLE 4

|  | Comparative Example 5 | | | | Comparative Example 6 | | | |
|---|---|---|---|---|---|---|---|---|
|  |  | Hybrid filter | | |  | Hybrid filter | | |
|  | TWC | Partition wall | TWC | SCR | TWC | Partition wall | TWC | SCR |
| Diameter (mm) | 105.7 | 157.5 | | | 105.7 | 157.5 | | |
| Length (mm) | 114.3 | 152.4 | | | 114.3 | 152.4 | | |
| Volume (L) | 1.00 | 2.97 | | | 1.00 | 2.97 | | |
| Initial pressure loss (kPa) | 3.57 | 3.48 | | | 3.57 | 2.8 | | |
| Pressure loss with soot (kPa) | 3.57 | 6.6 | | | 3.57 | 5.04 | | |
| Amount of loaded catalyst (g) | 201 | 30 | 236 | 350 | 201 | 30 | 236 | 350 |
| Length of exhaust gas purifying device (mm) | | 266.7 | | | | 266.7 | | |
| Initial pressure loss of device (kPa) | | 7.05 | | | | 6.37 | | |
| Pressure loss of device with soot (kPa) | | 10.17 | | | | 8.61 | | |
| TWC total amount (g) | | 448 | | | | 448 | | |
| SCR total amount (g) | | 369 | | | | 369 | | |
| Isostatic strength (MPa) | — | 4.8 | | | — | 0.3 | | |
| Collecting efficiency (%) | — | 97.5 | | | — | 96.0 | | |

TABLE 5

|  | Structure | Partition wall thickness (mm) | Partition wall porosity (%) | Partition wall ave. pore dia. (μm) | Cell density (cells/cm$^2$) | Projecting portion thickness (μm) |
|---|---|---|---|---|---|---|
| Comparative Example 1 | Usual | 0.305 | 65 | 23 | 46.5 | — |
| Example 1 | Hybrid wall | 0.15 | 48 | 12 | 46.5 | 0.15 |
| Example 2 | Hybrid wall | 0.15 | 48 | 12 | 46.5 | 0.15 |
| Comparative Example 2 | Hybrid wall | 0.15 | 48 | 12 | 46.5 | 0.15 |
| Example 3 | Hybrid wall | 0.15 | 40 | 12 | 46.5 | 0.15 |
| Comparative Example 3 | Hybrid wall | 0.15 | 35 | 12 | 46.5 | 0.15 |
| Comparative Example 4 | Hybrid wall | 0.15 | 48 | 12 | 46.5 | 0.0375 |
| Example 4 | Hybrid wall | 0.15 | 48 | 12 | 46.5 | 0.0525 |
| Example 5 | Hybrid wall | 0.15 | 48 | 12 | 46.5 | 0.2025 |
| Comparative Example 5 | Hybrid wall | 0.15 | 48 | 12 | 46.5 | 0.2175 |
| Example 6 | Hybrid wall | 0.15 | 48 | 26 | 46.5 | 0.15 |
| Comparative Example 6 | Hybrid wall | 0.15 | 75 | 12 | 46.5 | 0.15 |

|  | Projecting portion porosity (%) | Projecting portion ave. pore dia. (μm) | Partition wall coat ratio (%) | ISO strength | Initial pressure loss | Pressure loss with soot | Collecting efficiency |
|---|---|---|---|---|---|---|---|
| Comparative Example 1 | — | — | 100 | OK | NG | NG | OK |
| Example 1 | 48 | 12 | 5 | OK | OK | OK | OK |
| Example 2 | 48 | 12 | 40 | OK | OK | OK | OK |
| Comparative Example 2 | 48 | 12 | 50 | OK | OK | NG | OK |
| Example 3 | 40 | 12 | 5 | OK | OK | OK | OK |
| Comparative Example 3 | 35 | 12 | 5 | OK | OK | NG | OK |
| Comparative Example 4 | 48 | 12 | 5 | NG | OK | OK | OK |
| Example 4 | 48 | 12 | 5 | OK | OK | OK | OK |
| Example 5 | 48 | 12 | 5 | OK | OK | OK | OK |
| Comparative Example 5 | 48 | 12 | 5 | OK | NG | OK | OK |
| Example 6 | 48 | 26 | 5 | OK | OK | OK | NG |
| Comparative Example 6 | 75 | 12 | 5 | NG | OK | OK | OK |

[Porosity]:

Porosities of the partition walls and the projecting portions were calculated by a following method. First, SEM photographs of three portions of the partition walls of the plugged honeycomb structure in the cross section vertical to the cell extending direction were arbitrarily photographed by a scanning type electron microscope (SEM). In one view field, a vertical size×a horizontal size was "p×p", when a size of one cell (a cell pitch) was "p". Next, each photographed image was binarized by image analysis, and the image was divided into a cavity portion (i.e., a pore portion) and a portion other than the cavity portion. Next, a ratio of an area covered by the cavity portion in each image was calculated, and an average value was obtained. In this way, the porosity of the partition walls and the projecting portions was calculated.

[Average Pore Diameter]:

An average pore diameter of the partition walls was a value measured by the image analysis in the same manner as in the porosity of the partition walls.

As to the prepared honeycomb catalyst body or exhaust gas purifying device, respective evaluations of [Initial Pressure Loss], [Pressure Loss with Soot], [Isostatic Strength] and [Collecting Efficiency] were carried out. An evaluating method of each evaluation is as follows.

[Initial Pressure Loss]:

As to the exhaust gas purifying device (including a can member in which honeycomb catalyst bodies were arranged in series and contained), a burning gas at 600° C. which was obtained by burning a propane gas was supplied to the above exhaust gas purifying device at a flow rate of 200 kg/hour, to measure the initial pressure losses of the honeycomb catalyst bodies and the exhaust gas purifying device. The measured initial pressure loss of the exhaust gas purifying device was evaluated in accordance with the following evaluation standards. In the exhaust gas purifying device, a case where the initial pressure loss is 7 kPa or more is "NG", and a case where the initial pressure loss is smaller than 7 kPa is "OK".

[Pressure Loss with Soot]:

As to the exhaust gas purifying device (including the can member in which honeycomb catalyst bodies were arranged in series and contained), 1 g/L of soot was deposited on the honeycomb catalyst body, by an artificial soot generating device which burned light oil to generate the soot. A burning gas at 600° C. which was obtained by burning the light oil was supplied to the above exhaust gas purifying device at a flow rate of 200 kg/hour in a state where the soot was deposited in this manner, to measure the pressure losses of the honeycomb catalyst bodies and the exhaust gas purifying device with the soot. The measured pressure loss of the exhaust gas purifying device with the soot was evaluated in accordance with the following evaluation standards. In the exhaust gas purifying device, a case where the pressure loss with the soot is 12 kPa or more is "NG", and a case where the pressure loss with the soot is smaller than 12 kPa is "OK".

[Isostatic Strength]:

The isostatic strength of the prepared honeycomb catalyst body (the hybrid filter) was measured. The isostatic strength was measured on the basis of an isostatic breaking strength test stipulated in car standard (JASO standard) M505-87 issued by the Society of Automotive Engineers of Japan. The isostatic breaking strength test is a test in which a honeycomb catalyst body is disposed in a rubber tubular container, and the container is closed with a lid of a plate made of aluminum, to carry out isotropic pressurizing compression in water. The isostatic breaking strength is indicated by an applied pressure value (MPa) when the honeycomb catalyst body breaks. It is to be noted that the isostatic breaking strength test is a test to simulate a compressive load application of the honeycomb catalyst body contained in a can member in a state where an outer peripheral surface of the honeycomb catalyst body is held, when the honeycomb catalyst body is mounted in a car. Additionally, in Comparative Example 1, the isostatic strength was measured when a catalyst was loaded onto a usual (conventional) filter.

The measured isostatic strengths were evaluated in accordance with the following evaluation standard. That is, a case where the isostatic strength of the honeycomb catalyst body (the hybrid filter) is 1 MPa or less is "NG", and a case where the isostatic strength is in excess of 1 MPa is "OK".

[Collecting Efficiency]:

The collecting efficiency of the prepared honeycomb catalyst body was measured. Specifically, the honeycomb catalyst body (the hybrid filter) was set to the above-mentioned artificial soot generating device, and supply conditions of the exhaust gas including the soot were set to a gas flow rate of 174 kg/hour and a gas temperature of 290° C. Next, a soot deposition speed was set to 2 g/hour. Respective exhaust gases on an inlet side (upstream) and an outlet side (downstream) of the honeycomb catalyst body were sucked (sampled) by a smoke meter manufactured by AVL Co., and the sampled gases were passed through filter paper to take fine particles. Afterward, a soot concentration was calculated from blackness of reflected light of the above filter paper by use of a conversion formula in a measuring unit of the above smoke meter. The collecting efficiency is a value at a deposited soot amount of 0.5 (g/honeycomb catalyst body). The collecting efficiency is calculated from the measured value of the smoke meter (the concentration of the soot) in terms of the following calculating equation. The calculated collecting efficiency was evaluated in accordance with the following evaluation standard. A case where the collecting efficiency is 95% or more is "OK", and a case where the collecting efficiency is smaller than 95% is "NG".

collecting efficiency (%)=100×{1−(the concentration of the soot in the downstream gas of the honeycomb catalyst body)/(the concentration of the soot in the upstream gas of the honeycomb catalyst body)}                     Equation:

Examples 2 to 6

The procedures of Example 1 were repeated except that honeycomb catalyst bodies and exhaust gas purifying devices satisfying conditions shown in Table 1 and Table 2 were prepared, to prepare the exhaust gas purifying devices. Afterward, the respective prepared honeycomb catalyst bodies and exhaust gas purifying devices were evaluated in the same manner as in Example 1. The results are shown in Table 1, Table 2, and Table 5.

Comparative Examples 1 to 6

The procedures of Example 1 were repeated except that honeycomb catalyst bodies and exhaust gas purifying devices satisfying conditions shown in Table 3 and Table 4 were prepared, to prepare the exhaust gas purifying devices of Comparative Examples 1 to 6. Afterward, the respective prepared honeycomb catalyst bodies and exhaust gas purifying devices were evaluated in the same manner as in Example 1. The results are shown in Table 3 to Table 5.

Additionally, in Comparative Example 1, the exhaust gas purifying device was used in which in order from an upstream side, a honeycomb catalyst body loaded with a TWC, a gasoline particulate filter (GPF) and a honeycomb catalyst body loaded with an SCR were arranged in series. A catalyst density of the honeycomb catalyst body loaded with the TWC was 200 g/l. The TWC was loaded onto the gasoline particulate filter, and a density of this catalyst was 100 g/l. A catalyst density of the honeycomb catalyst body loaded with the SCR was 175 g/l. It is to be noted that in Table 3, the honeycomb catalyst body loaded with the TWC is indicated by "TWC", and the honeycomb catalyst body loaded with the SCR is indicated by "SCR".

Examples 7 to 9

The procedures of Example 1 were repeated except that honeycomb catalyst bodies and exhaust gas purifying devices satisfying conditions shown in Table 6 were prepared, to prepare the exhaust gas purifying devices. Afterward, the respective prepared honeycomb catalyst bodies (Examples 7 to 9) and exhaust gas purifying devices were evaluated in the same manner as in Example 1. The results are shown in Table 6 and Table 7. It is to be noted that in Table 6, "TWC" indicates a three-way catalyst, and "NSC" indicates an $NO_x$ adsorber catalyst.

TABLE 6

|  | Example 7 | | | | Example 8 | | | |
|---|---|---|---|---|---|---|---|---|
|  | | Hybrid filter | | | | Hybrid filter | | |
|  | TWC | Partition wall | TWC | NSC | TWC | Partition wall | TWC | NSC |
| Diameter (mm) | 105.7 | 157.5 | | | 105.7 | 157.5 | | |
| Length (mm) | 114.3 | 152.4 | | | 114.3 | 152.4 | | |
| Volume (L) | 1.00 | 2.97 | | | 1.00 | 2.97 | | |
| Initial pressure loss (kPa) | 3.57 | 2.74 | | | 3.57 | 2.77 | | |
| Pressure loss with soot (kPa) | 3.57 | 6.35 | | | 3.57 | 8.27 | | |
| Amount of loaded catalyst (g) | 201 | 26 | 235 | 287 | 201 | 219 | 148 | 181 |
| Length of exhaust gas purifying device (mm) | | 266.7 | | | | 266.7 | | |
| Initial pressure loss of device (kPa) | | 6.31 | | | | 6.34 | | |
| Pressure loss of device with soot (kPa) | | 9.92 | | | | 11.84 | | |
| TWC total amount (g) | | 448 | | | | 448 | | |
| NSC total amount (g) | | 301 | | | | 301 | | |
| Isostatic strength (MPa) | — | 3.0 | | | — | 3.2 | | |
| Collecting efficiency (%) | — | 97.5 | | | — | 98.8 | | |

|  | Example 9 | | | | Comparative Example 7 | | | |
|---|---|---|---|---|---|---|---|---|
|  | | Hybrid filter | | | | | | |
|  | TWC | Partition wall | TWC | NSC | TWC | GPF | NSC | |
| Diameter (mm) | 105.7 | 157.5 | | | 105.7 | 143.8 | 105.7 | |
| Length (mm) | 114.3 | 152.4 | | | 114.3 | 152.4 | 114.3 | |
| Volume (L) | 1.00 | 2.97 | | | 1.00 | 2.48 | 1.00 | |
| Initial pressure loss (kPa) | 3.57 | 2.91 | | | 3.57 | 3.44 | 4.4 | |
| Pressure loss with soot (kPa) | 3.57 | 7.71 | | | 3.57 | 9.57 | 4.4 | |
| Amount of loaded catalyst (g) | 201 | 26 | 235 | 287 | 201 | 248 | 301 | |
| Length of exhaust gas purifying device (mm) | | 266.7 | | | | 381 | | |
| Initial pressure loss of device (kPa) | | 6.48 | | | | 11.41 | | |
| Pressure loss of device with soot (kPa) | | 11.28 | | | | 17.54 | | |
| TWC total amount (g) | | 448 | | | | 448 | | |
| NSC total amount (g) | | 301 | | | | 301 | | |
| Isostatic strength (MPa) | — | 3.2 | | | — | 2.9 | — | |
| Collecting efficiency (%) | — | 96.9 | | | — | 97.6 | — | |

TABLE 7

|  | Structure | Partition wall thickness (mm) | Partition wall porosity (%) | Partition wall ave. pore dia. (μm) | Cell density (cells/cm$^2$) | Projecting portion thickness (μm) | Projecting portion porosity (%) |
|---|---|---|---|---|---|---|---|
| Example 7 | Hybrid wall | 0.15 | 48 | 12 | 46.5 | 0.15 | 48 |
| Example 8 | Hybrid wall | 0.15 | 48 | 12 | 46.5 | 0.15 | 48 |
| Example 9 | Hybrid wall | 0.15 | 48 | 12 | 46.5 | 0.15 | 40 |
| Comparative Example 7 | Usual | 0.305 | 65 | 23 | 46.5 | — | — |

|  | Projecting portion ave. pore dia. (μm) | Partition wall coat ratio (%) | ISO strength | Initial pressure loss | Pressure loss with soot | Collecting efficiency |
|---|---|---|---|---|---|---|
| Example 7 | 12 | 5 | OK | OK | OK | OK |
| Example 8 | 12 | 40 | OK | OK | OK | OK |

TABLE 7-continued

| Example 9 | 12 | 5 | OK | OK | OK | OK |
|---|---|---|---|---|---|---|
| Comparative Example 7 | — | 100 | OK | NG | NG | OK |

Comparative Example 7

The procedures of Example 1 were repeated except that a honeycomb catalyst body and an exhaust gas purifying device satisfying conditions shown in Table 6 were prepared, to prepare the exhaust gas purifying device of Comparative Example 7. Afterward, the respective prepared honeycomb catalyst bodies and exhaust gas purifying devices were evaluated in the same manner as in Example 1. The results are shown in Table 6 and Table 7.

In the honeycomb catalyst bodies of Examples 1 to 9, it was possible to confirm that a length of each whole exhaust gas purifying device could be small, a mechanical strength was high, a pressure loss was small, and a purification performance was suitable. Moreover, in the honeycomb catalyst bodies of Examples 1 to 5 and 7 to 9, it was possible to confirm that a collecting efficiency was suitable. Additionally, in Example 6, an average pore diameter of the partition walls was in excess of 25 μm (26 μm), and hence a collecting performance (a collecting efficiency) of ash and particulate materials deteriorated as compared with the other examples.

A honeycomb catalyst body of the present invention can suitably be used in purification of an exhaust gas.

DESCRIPTION OF REFERENCE NUMERALS

2: inflow side end surface, 3: outflow side end surface, 4: cell, 4a: inflow cell, 4b: outflow cell, 5: partition wall, 6: small cell, 7: outer peripheral wall, 8: plugged portion, 8a: inflow side plugged portion, 8b: outflow side plugged portion, 9 and 19: projecting portion, 9a and 19a: inflow cell side projecting portion, 9b and 19b: outflow cell side projecting portion, 10: plugged honeycomb structure, and 100 and 101: honeycomb catalyst body.

What is claimed is:

1. A honeycomb catalyst body comprising:
   a plugged honeycomb structure having porous partition walls which define and form a plurality of cells extending from an inflow side end surface to an outflow side end surface to become through channels of a fluid, inflow side plugged portions provided at inflow side ends of the predetermined cells, outflow side plugged portions provided at outflow side ends of the remaining cells, and porous projecting portions which project so as to extend from the partition walls into inflow cells, that are defined as the cells provided with the outflow side plugged portions, and porous projecting portions which project so as to extend from the partition walls into outflow cells, that are defined as the cells provided with the inflow side plugged portions, and which are formed integrally with the partition walls; and
   a catalyst loaded onto the projecting portions of the plugged honeycomb structure,
   wherein a porosity of the partition walls of the plugged honeycomb structure is from 40 to 70%, a thickness of the projecting portions is from 30 to 140% of a thickness of the partition walls,
   an amount of a catalyst loaded onto the partition walls in a cross section vertical to an extending direction of the cells is 40% or less of a total amount of the catalyst loaded onto the plugged honeycomb structure, and the amount of the catalyst loaded onto the partition walls is smaller than an amount of the catalyst loaded onto the projecting portions, and
   the catalyst loaded onto the projecting portions extending into the inflow cells of the plugged honeycomb structure is a three-way catalyst or an $NO_x$ adsorber catalyst, and the catalyst loaded onto the projecting portions extending into the outflow cells of the plugged honeycomb structure is a selective reduction catalyst, or
   the catalyst loaded onto the projecting portions extending into the inflow cells of the plugged honeycomb structure is a three-way catalyst, and the catalyst loaded onto the projecting portions extending into the outflow cells of the plugged honeycomb structure is an $NO_x$ adsorber catalyst.

2. The honeycomb catalyst body according to claim 1, wherein the amount of the catalyst loaded onto the partition walls of the plugged honeycomb structure is 5% or less of the total amount of the catalyst loaded onto the plugged honeycomb structure.

3. The honeycomb catalyst body according to claim 2, wherein an average pore diameter of the partition walls of the plugged honeycomb structure is 25 μm or less.

4. The honeycomb catalyst body according to claim 3, wherein each of the projecting portions of the plugged honeycomb structure is in the form of a wall which partitions the cell to form a plurality of cells.

5. The honeycomb catalyst body according to claim 4, wherein the thickness of the partition walls of the plugged honeycomb structure is from 64 to 508 μm.

6. The honeycomb catalyst body according to claim 3, wherein each of the projecting portions of the plugged honeycomb structure is in the form of a protrusion which projects from the partition wall.

7. The honeycomb catalyst body according to claim 6, wherein the thickness of the partition walls of the plugged honeycomb structure is from 64 to 508 μm.

8. The honeycomb catalyst body according to claim 1, wherein an average pore diameter of the partition walls of the plugged honeycomb structure is 25 μm or less.

9. The honeycomb catalyst body according to claim 1, wherein each of the projecting portions of the plugged honeycomb structure is in the form of a wall which partitions the cell to form a plurality of cells.

10. The honeycomb catalyst body according to claim 1, wherein each of the projecting portions of the plugged honeycomb structure is in the form of a protrusion which projects from the partition wall.

11. The honeycomb catalyst body according to claim 1, wherein the thickness of the partition walls of the plugged honeycomb structure is from 64 to 508 μm.

* * * * *